(12) United States Patent
Lassure et al.

(10) Patent No.: US 11,600,289 B2
(45) Date of Patent: Mar. 7, 2023

(54) METHODS, APPARATUS AND SYSTEMS FOR LOW LATENCY AUDIO DISCONTINUITY FADE OUT

(71) Applicant: Dolby International AB, Amsterdam Zuidoost (NL)

(72) Inventors: Gael Lassure, Fuerth (DE); Alexander Stahlmann, Bubenreuth (DE)

(73) Assignee: Dolby International AB, Amsterdam Zuidoost (NL)

( * ) Notice: Subject to any disclaimer, the term of this patent is extended or adjusted under 35 U.S.C. 154(b) by 30 days.

(21) Appl. No.: 17/236,923

(22) Filed: Apr. 21, 2021

(65) Prior Publication Data

US 2021/0327452 A1 Oct. 21, 2021

Related U.S. Application Data

(60) Provisional application No. 63/013,109, filed on Apr. 21, 2020.

(30) Foreign Application Priority Data

Apr. 21, 2020 (EP) ..................................... 20170566

(51) Int. Cl.
*H03G 3/00* (2006.01)
*G10L 21/034* (2013.01)
(Continued)

(52) U.S. Cl.
CPC ............ *G10L 21/034* (2013.01); *G06F 3/165* (2013.01); *H04R 3/04* (2013.01); *H04R 2430/01* (2013.01)

(58) Field of Classification Search
CPC ......... G10L 21/034; G06F 3/165; H04R 3/04; H04R 2430/01
(Continued)

(56) References Cited

U.S. PATENT DOCUMENTS

2009/0024234 A1\* 1/2009 Archibald ............ G11B 27/038
700/94

FOREIGN PATENT DOCUMENTS

| WO | 2006079348 | 8/2006 | |
| WO | WO-2006079348 A1 \* | 8/2006 | ........... G10L 19/005 |

(Continued)

OTHER PUBLICATIONS

Perkins, C. et al "A Survey of Packet Loss Recovery Techniques for Streaming Audio" IEEE Network, vol. 12, No. 5, Sep. 1, 1998, pp. 40-48.

*Primary Examiner* — Ammar T Hamid

(57) ABSTRACT

The present document discloses a method for fading discontinued audio feeds for replay by a speaker. In particular, the method may first comprise receiving an input audio feed comprising a plurality of samples. The method may further comprise determining whether the input audio feed is discontinued. And, when discontinuity of the input audio feed is detected, the method may comprise generating an intermediate audio signal comprising a plurality of samples based on the discontinued input audio feed. In particular, the intermediate audio signal may be generated based on a last portion of the discontinued input audio feed that has been output for replay. In addition, the method may further comprise applying a fadeout function to the intermediate audio signal to generate a fadeout audio signal. Finally, the method may comprise outputting the fadeout audio signal for replay by the speaker.

18 Claims, 11 Drawing Sheets

(51) Int. Cl.
*G06F 3/16* (2006.01)
*H04R 3/04* (2006.01)
*H04R 1/40* (2006.01)

(58) Field of Classification Search
USPC .................................................. 381/98, 97
See application file for complete search history.

(56) References Cited

FOREIGN PATENT DOCUMENTS

| WO | 2011064055 | 6/2011 | |
|---|---|---|---|
| WO | WO-2011064055 A1 * | 6/2011 | ........... G10L 19/005 |

* cited by examiner

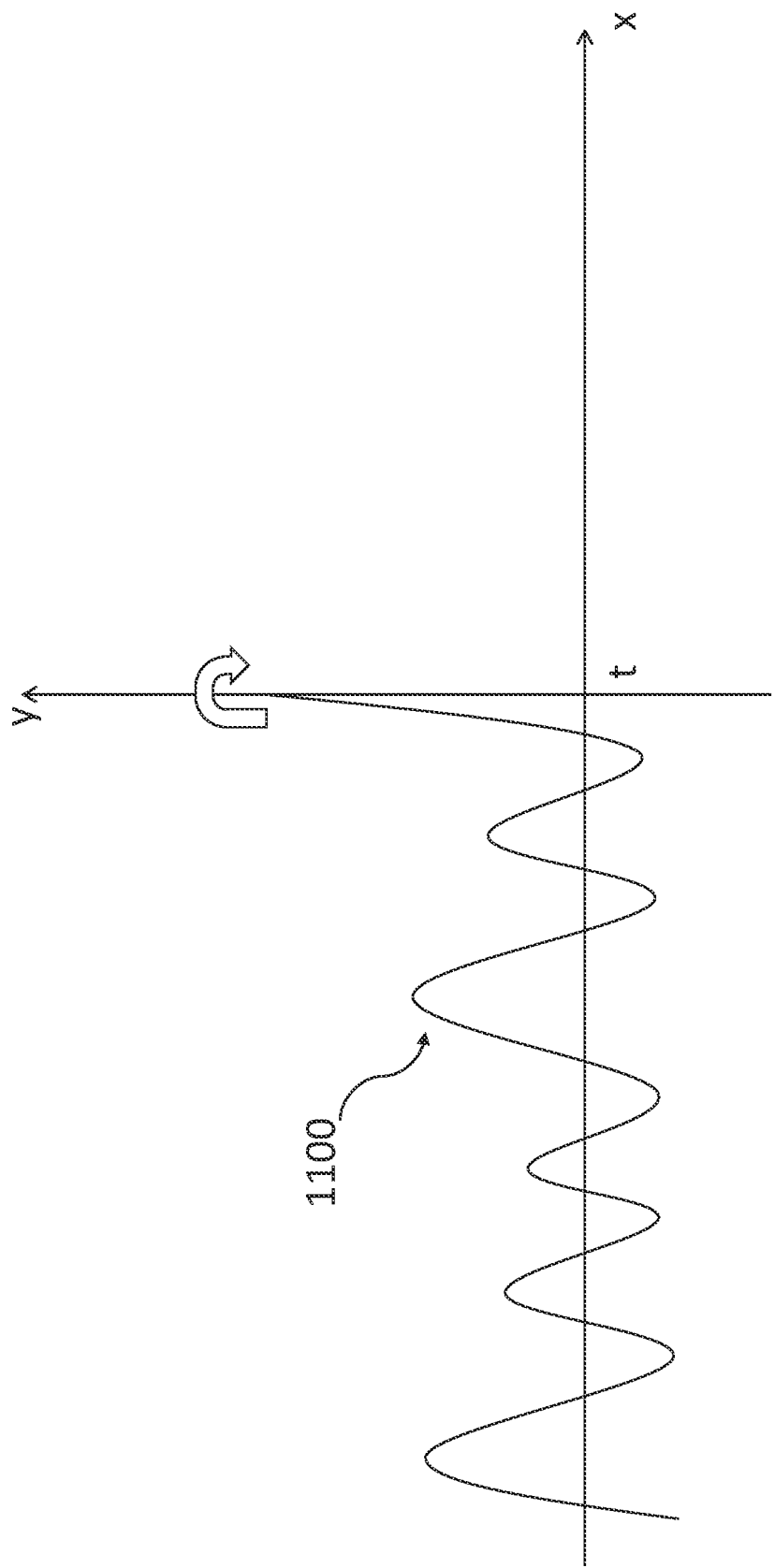

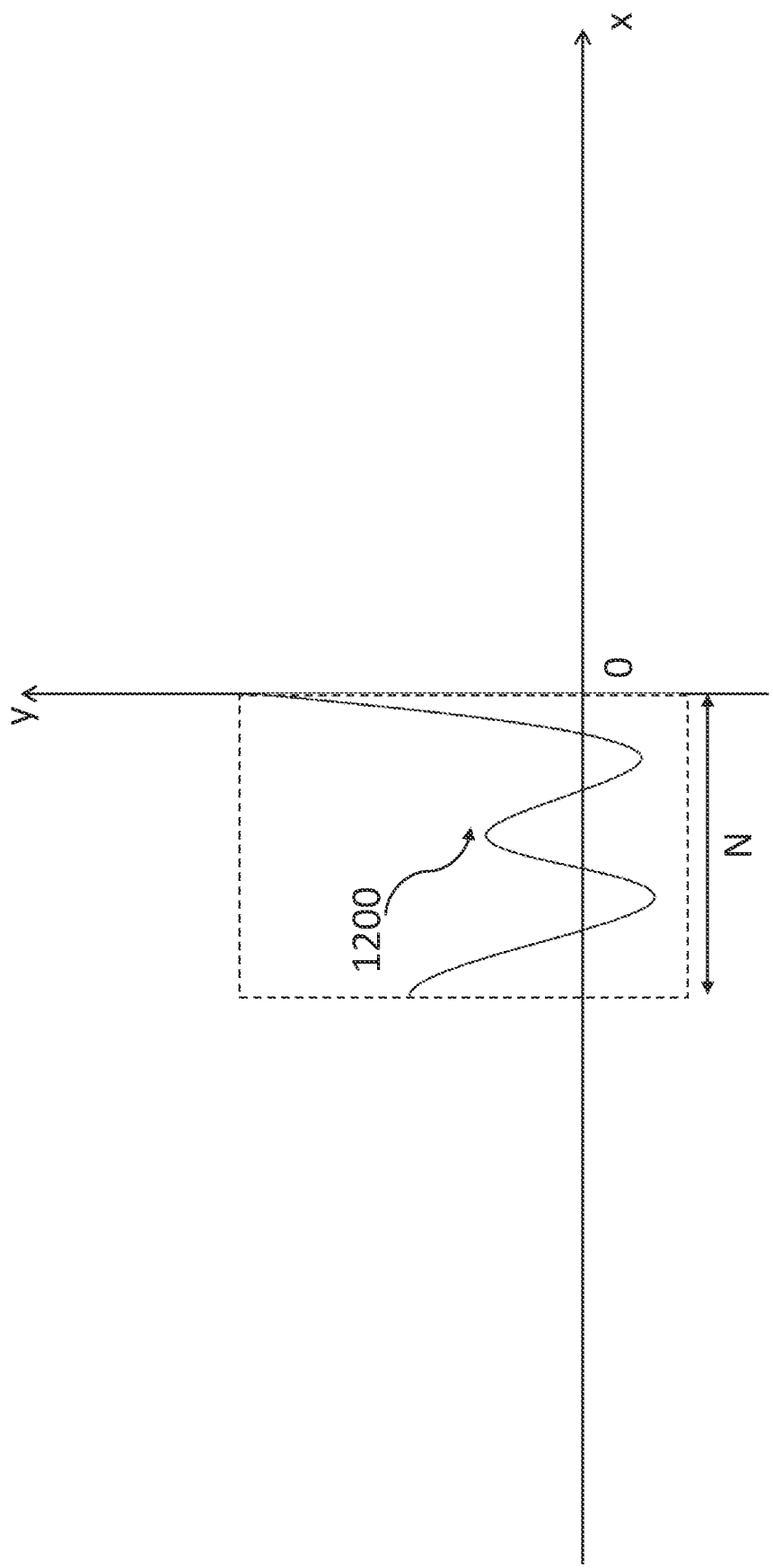

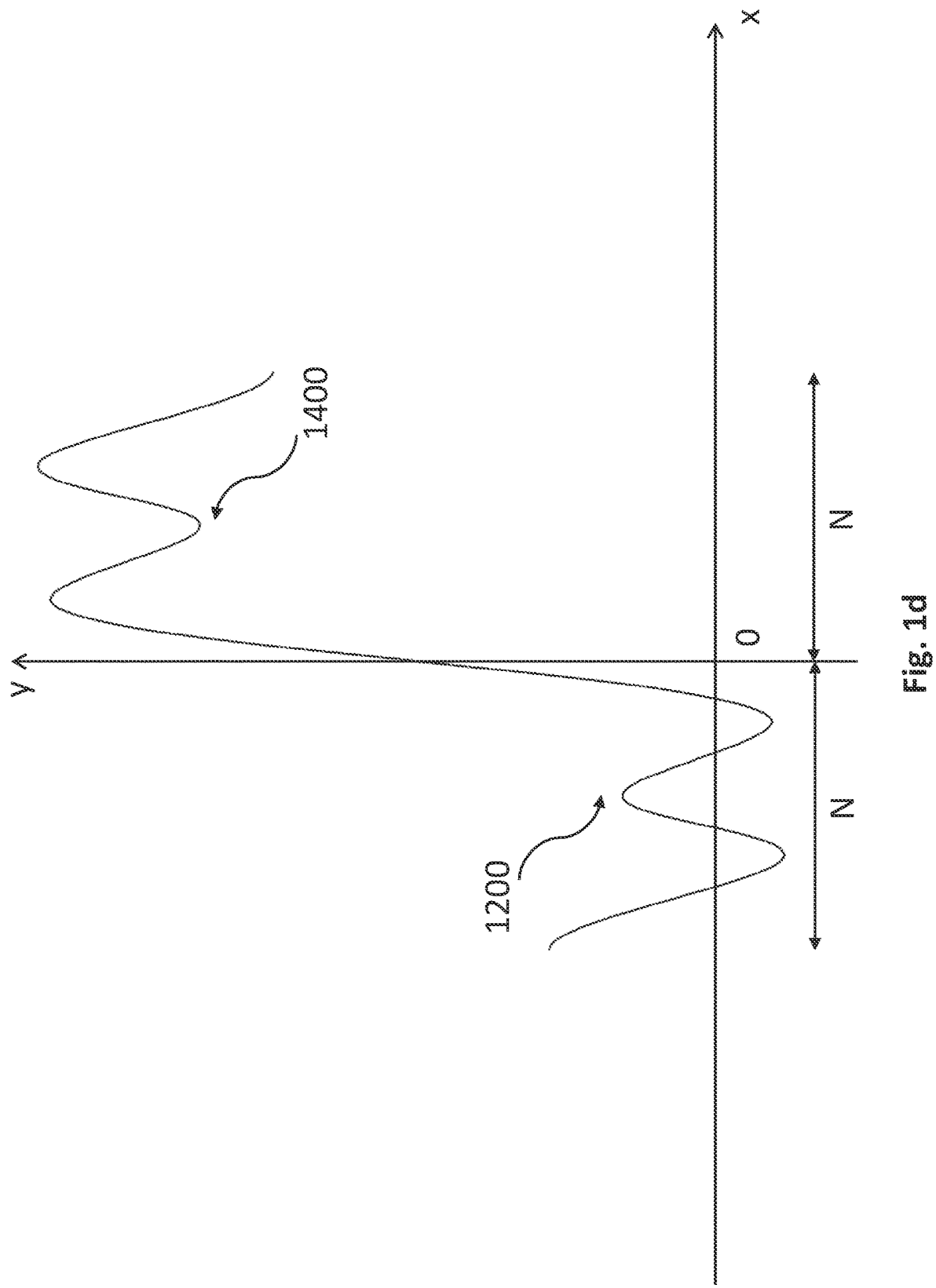

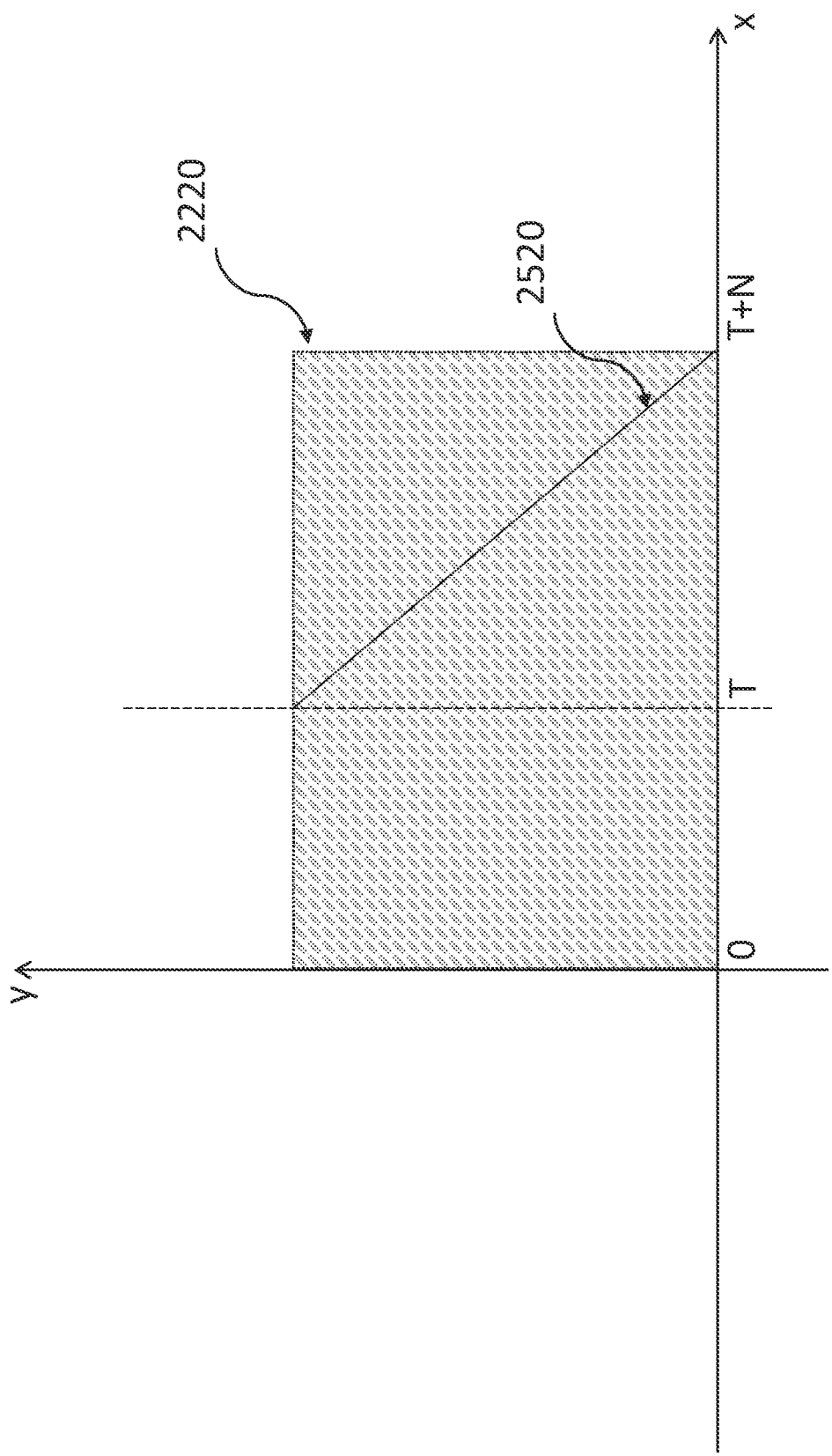

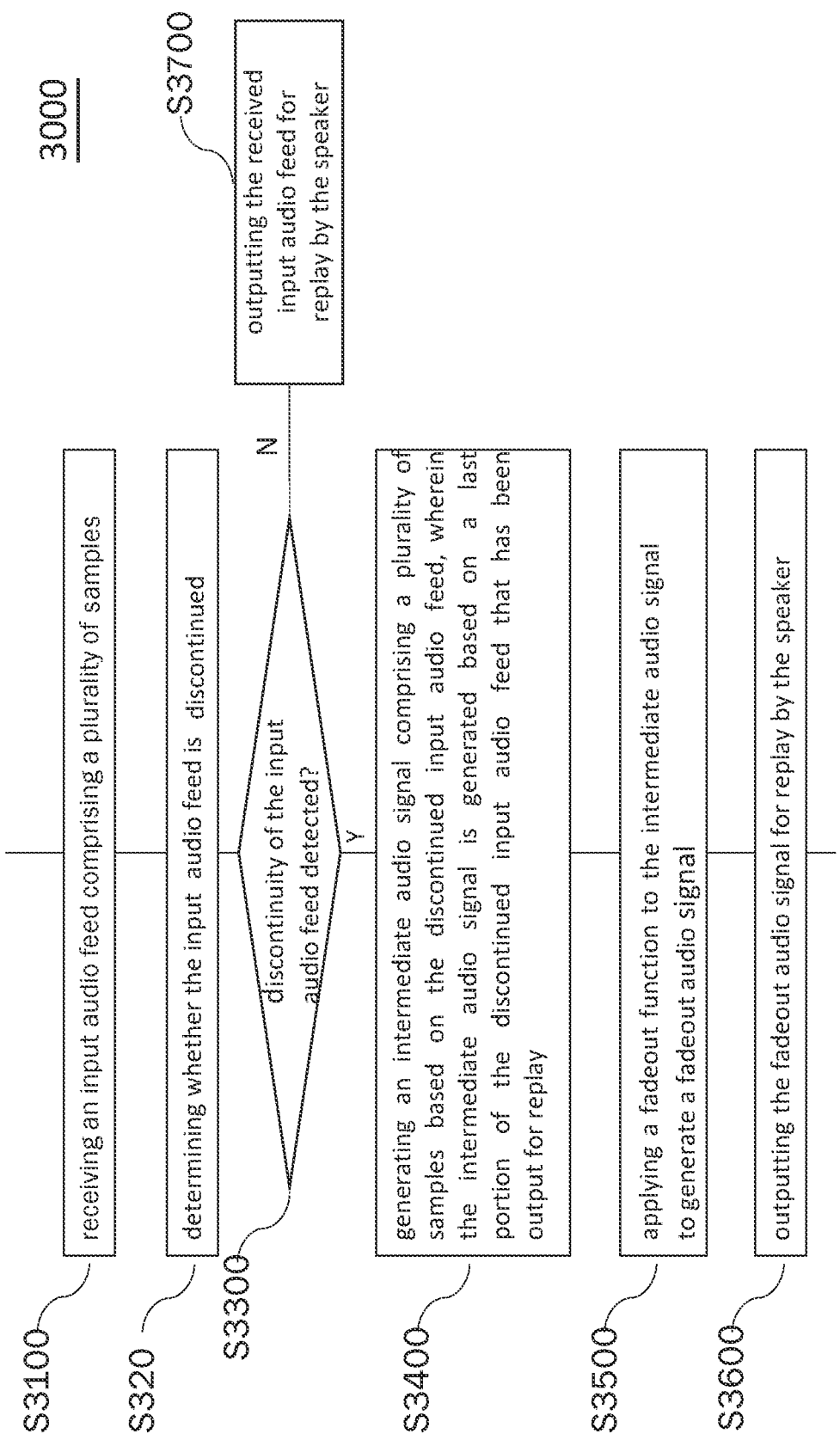

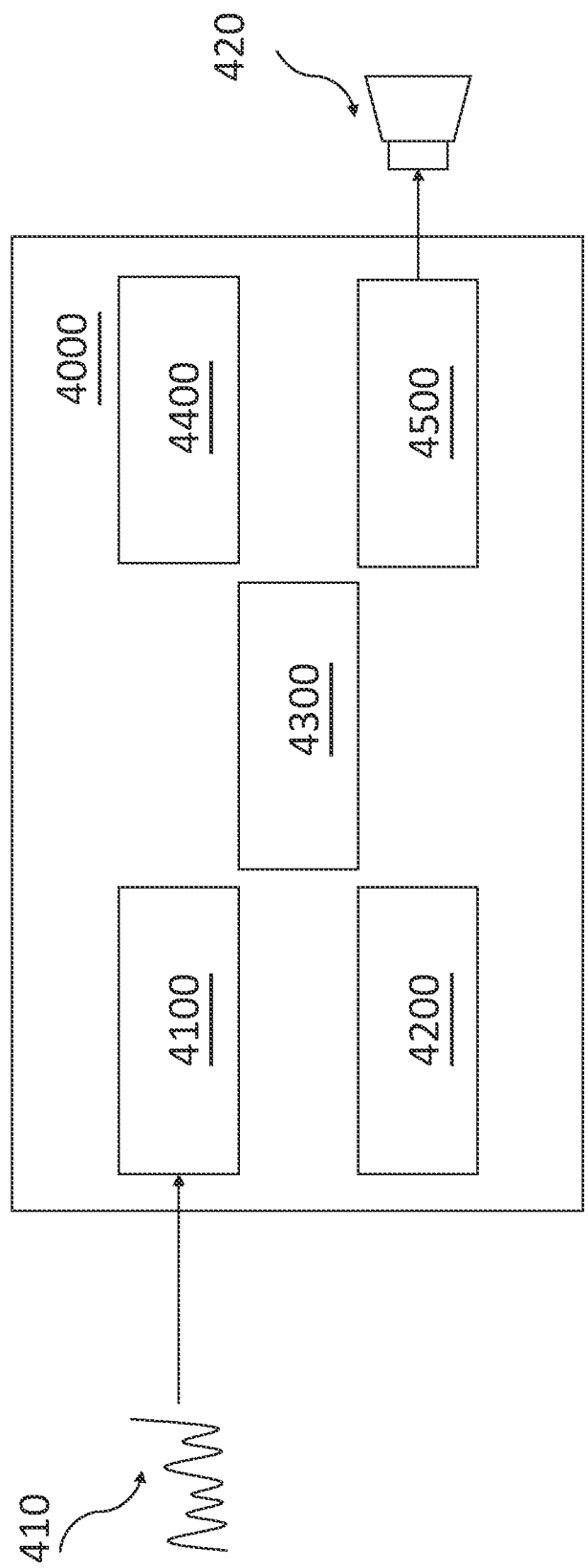

METHODS, APPARATUS AND SYSTEMS FOR LOW LATENCY AUDIO DISCONTINUITY FADE OUT

CROSS-REFERENCE TO RELATED APPLICATIONS

This application claims the benefit of priority from U.S. Provisional Patent Application No. 63/013,109, and EP Patent Application No. 20170566.2, both filed on Apr. 21, 2020, each of which is hereby incorporated by reference in its entirety.

TECHNICAL FIELD

The present disclosure generally relates to audio signal processing. In particular, the present disclosure relates to an audio signal processing mechanism for fading out discontinued audio signals or feeds for replay by a speaker, preferably with low or zero latency.

BACKGROUND

Generally speaking, in real time (RT) systems that are optimized for low latency, on switching events (e.g., the user/consumer switches to another channel), the system might end up in a situation where it has to gracefully end the old content, but may unfortunately have no material (of the old content) to perform a graceful fadeout.

In particular, when any input starves, in order to prevent distortion on the output due to the signal discontinuity, it is generally common to fade out the starving content. However, for fade out to work, it is generally required to implement for example delay buffers (or sometimes as referred to as look-ahead buffers for storing future samples that have not yet been played out), so that the system may still have samples left to fade them out.

Typically, products which generally integrate audio mixers, object mergers, etc., are expected to produce continuous output whatever happens to any of the mixed or merged input signal. Moreover, these products and/or systems should also exhibit very low latency in order to ensure the best user experience.

Thus, there is a need to provide a signal processing mechanism (e.g., for audio signals) with reduced/low (or preferably even no) latency or delay when audio signals are being faded out. In addition, there is also a need to provide a signal processing mechanism for fading out (audio) signals with minimum or no impact on the audible quality thereof, thereby to provide an acceptable and satisfactory user experience.

SUMMARY

In view of some or all of the above problems and/or use cases, the present disclosure generally proposes a method for fading discontinued audio feeds for replay by a speaker, a corresponding apparatus and non-transitory computer readable medium, having the features of the respective independent claims.

Broadly speaking, the general idea of the present disclosure is to perform look-behind instead of look-ahead when performing the fadeout. That is, to remember the last couple of (e.g., hundreds of) played samples of a to-be-fadeout signal and to replay them backward (warping) with a mirroring function (e.g., a reflection function). In particular, the mirroring function may ensure continuity of the signal when being faded out. In addition, there may as well be provided a compression function that ensures non-saturating signal.

An aspect of the disclosure relates to a method for fading discontinued audio feeds for replay by a speaker. The speaker may be part of an audio (and/or video) playback system (e.g., a TV with speakers). In some implementations, the method may be also applied to an A/V receiver or an audio (and/or video) re-encoder.

In particular, the method may first comprise receiving an input audio feed comprising a plurality of samples. The input audio feed may for example be an audio playback signal (e.g., a song or a movie with audio) or a continuous live stream (e.g., a live radio or TV broadcast channel). Depending on various circumstances, the input audio feed may be discontinued at some point of time. By way of example but not limitation, such discontinuity of the (old) input audio feed may for instance be caused or triggered by a user (or a consumer) deciding to switch to another feed (e.g., another audio or TV channel) and operating the remote control accordingly. Correspondingly, in such cases, the method may further comprise determining whether the input audio feed is discontinued. The determination (or, in some cases, the detection) of the discontinuity of the input audio feed may be achieved in any suitable means, as will be appreciated by the skilled person. For instance, such determination or detection may involve monitoring the reception (e.g., by monitoring the receiving buffers) of the input audio feed. And, when discontinuity of the input audio feed is detected, the method may comprise generating an intermediate audio signal comprising a plurality of samples based on the discontinued input audio feed. In other words, the intermediate audio signal may be generated based on the discontinued input audio feed, e.g., based partially or entirely on some or all of the (audio) samples thereof. In particular, in some cases it may be preferable that the intermediate audio signal is generated based on a last portion (of samples) of the discontinued input audio feed that has already been output for replay. In addition, the method may further comprise applying a fadeout function (or, in some cases, also referred to as a smooth function) to the intermediate audio signal to generate a fadeout audio signal. Particularly, the fadeout function may be implemented in any suitable manner, such that it can facilitate smoothing of the earlier generated intermediate audio signal before being played back by the speaker. Finally, the method may comprise outputting the fadeout audio signal for replay by the speaker.

Configured as proposed, particularly by utilizing the last portion of the discontinued input audio feed, the discontinued input audio signal may be faded out gracefully and efficiently, without the need of any look-ahead buffers to be implemented, thereby reducing or minimizing possible delay or latency during fading out the discontinued audio signal. In addition, the quality of the output fadeout audio signal is also not sacrificed, thereby preserving and ensuring satisfactory user experience.

In some embodiments, the intermediate audio signal may be generated such that samples of the intermediate audio signal may mirror samples of the last portion of the discontinued input audio feed. Here, the mirroring may include a line reflection in the time-amplitude plane, as well as a point reflection in the time-amplitude plane. In general, such mirroring operation may be performed in any suitable manner, such as (but is not limited to) edge-mirroring, axis-mirroring, point-mirroring, time-mirroring, etc. In some cases, the term "mirroring" may also be used interchangeably with the term "reflecting". Also, all or a subset of the samples of the last portion of the discontinued input audio feed may be used for performing said mirroring operation (e.g., reflection operation), as will be appreciated by the skilled person.

In some embodiments, the generation of the intermediate audio signal may involve time-mirroring samples of the last portion of the discontinued input audio feed such that samples corresponding to samples of the last portion may be included in the samples of the intermediate audio signal in reverse order. Accordingly, a sample in the intermediate audio signal for a timing that is by a given time period after the input audio feed is discontinued may have the same (or corresponding) sample value as a corresponding sample in the (last portion of the) input audio feed for a timing that is by the given time period before the input audio feed is discontinued. In some other cases, it may also be possible that samples of the last portion of the discontinued input audio feed may be simply repeated as samples of the intermediate audio signal, i.e., without the reverse mirroring (ordering). However, in these cases continuity at and after the last sample of the last portion of the discontinued input audio feed may have to be handled properly, in order to avoid unacceptable user experience (e.g., artifacts) after being replayed by the speaker, as will be appreciated by the skilled person.

In some embodiments, the intermediate audio signal may be generated such that the last portion of the discontinued input audio feed together with the (generated) intermediate audio signal is continuous. As such, the user experience of the end user (or consumer) may thus not be (noticeably) affected.

In some embodiments, the method may further comprise, prior to generating the intermediate audio signal, determining a number of samples to be generated for the intermediate audio signal in accordance with a predefined fadeout period. That is to say, based on the predefined fadeout period (e.g., 128 samples, 200 samples, 256 samples, etc.), the method may involve determining the number of samples that the to-be-generated intermediate audio signal may comprise. In one example, the number of samples in the intermediate audio signal may be the same as the size (in terms of number of samples) of the predefined fadeout period. Other relationship between the number of samples of the intermediate audio signal and the size of the fadeout period may of course be possible, depending on various implementations. Generally speaking, the length of the fadeout period may be considered as a compromise between quality (e.g., quality of the output fadeout audio signal) and cost (e.g., cost for the memory and/or computational cost for the storage/fade operation).

In some embodiments, the method may further comprise, prior to generating the intermediate audio signal, determining a number of samples of the last portion of the discontinued input audio feed in accordance with a predefined fadeout period, for use in generating the intermediate audio signal. That is to say, the predefined fadeout period (e.g., 128 samples, 200 samples, 256 samples, etc.) may also be used to determine the number of samples of the last portion of the discontinued input audio feed that is used for generating the intermediate audio signal. As an example, if the available samples in the last portion of the discontinued input audio feed is larger than the size (in terms of number of samples) N of the predefined fadeout period, then a subset (e.g., the last N samples) of the available samples in the last portion of the discontinued input audio feed may be selected for generating the intermediate audio signal. As another example, if the available samples in the last portion of the discontinued input audio feed is smaller than the size of the predefined fadeout period, then some of the available samples in the last portion of the discontinued input audio feed may need to be repeated (or, in some cases, interpolated) in order to generate the intermediate audio signal.

In some embodiments, a number of samples in the intermediate audio signal may equal a number of samples in the last portion of the discontinued input audio feed. However, as will be understood and appreciated by the skilled person, the number of samples in the intermediate audio signal may as well be larger or smaller than that of the last portion of the discontinued input audio feed. In such cases, it may further be needed to determine a proper number of samples of the to-be-generated intermediate audio signal in accordance with a number of samples of the last portion of the discontinued input audio feed.

In some embodiments, the generation of the intermediate audio signal may involve reordering the samples in the last portion of the discontinued input audio feed in reverse order. In particular, if the number of samples in the intermediate audio signal equals the number of samples in the last portion of the discontinued input audio feed, then the intermediate audio signal may be generated simply by reverse ordering samples of last portion of the discontinued input audio feed. That is, the first sample of the intermediate audio signal may correspond to the last sample of last portion of the discontinued input audio feed; the second sample of the intermediate audio signal may correspond to the penultimate (i.e., second last) sample of last portion of the discontinued input audio feed; and so on.

In some embodiments, the intermediate audio signal may be generated by time-mirroring the samples in the last portion of the discontinued input audio feed. In particular, if the number of samples in the intermediate audio signal equals the number of samples in the last portion of the discontinued input audio feed, then the intermediate audio signal may be generated simply by mirroring (e.g., reflecting) samples of the last portion of the discontinued input audio feed to arrange them in a reverse time order (i.e., backwards in time). That is, the first sample of the intermediate audio signal may correspond to the last sample of last portion of the discontinued input audio feed; the second sample of the intermediate audio signal may correspond to the penultimate (i.e., second last) sample of last portion of the discontinued input audio feed; and so on. Here, "corresponding" samples may have the same or corresponding sample value.

In some embodiments, the generation of the intermediate audio signal may involve time-mirroring the samples in the last portion of the discontinued input audio feed while maintaining respective amplitudes of the samples. That is to say, when mirroring the samples in the last portion of the discontinued input audio feed backwards in time in order to generate the intermediate audio signal, the amplitude of each of the samples may remain unchanged. In some cases, such mirroring (i.e., without modifying the respective amplitudes) may be referred to as "edge-mirroring". That is to say, it may be considered that samples of the last portion of the discontinued input audio feed (or more precisely, excluding the last sample therein) and samples of the intermediate audio signal may be symmetric in respect to a vertical axis passing through the last sample of the discontinued input audio feed. In this sense, edge-mirroring may involve a line reflection in the time-amplitude plane (or time-sample value plane in general).

In some embodiments, the method may further comprise, prior to applying the fadeout function, applying a filtering function to the generated intermediate audio signal. In particular, the filtering function may be implemented in any suitable manner as will be appreciated by the skilled person. More particularly, the filtering function may be applied in such a manner that the last portion of the discontinued input audio feed together with the filtered intermediate audio signal satisfies the first order continuity after the last sample of the discontinued input audio feed. Sometimes, the first order continuity may also be referred to as having continuous first (-order) derivative. Notably, the discontinuity in the first order may typically be present in edge-mirroring, especially in cases when the amplitude of the last sample is relatively large or small (compared to the other samples). In such cases, the filtering function may be desirable or even necessary to smooth the amplitudes of the samples when the discontinued input audio feed and the generated intermediate audio signal are stitched together, or in other words, to be continuous in the first derivative after the last sample of the discontinued input audio feed. In some cases, it may be possible to have even higher orders (e.g., second order) of continuity, for example to further reduce (higher order) harmonic distortion, depending on various implementations and/or requirements. However, at least in some cases, the improvement in performance (e.g., reduction of the harmonic distortion) after a certain order of continuity may be considered to be negligible to human hearing.

In some embodiments, the generation of the samples of the intermediate audio signal may involve mirroring the corresponding samples in the last portion of the discontinued input audio feed with respect to the last sample of the discontinued input audio feed. In some cases, such mirroring (i.e., with respective to a particular sample having a respective amplitude value) may be referred to as "point-mirroring" (e.g., point reflection, or inversion), as opposed to the above mentioned "edge-mirroring". That is to say, it may be considered that samples of the last portion of the discontinued input audio feed (or more precisely, excluding the last sample therein) and samples of the intermediate audio signal may be symmetric in respect to a specific point (which is the last sample of the discontinued input audio feed in the present case). Compared to edge-mirroring (where respective amplitudes of the samples remain unchanged after mirroring), when generating the intermediate audio signal using point-mirroring, the amplitude of a sample in the intermediate audio signal is also mirrored with respect to the amplitude of the last sample of the discontinued input audio feed. Notably, since in point-mirroring amplitudes of the samples of the generated intermediate audio signal are also to be mirrored with respect to (the amplitude of) the last sample of the discontinued audio signal, first order continuity would typically (or even inherently) be met. Therefore, the filtering function as mentioned above for smoothing the output curve for the edge-mirroring cases may be omitted (or avoided) in cases of point-mirroring. Thereby, efficiency of the overall fadeout method may be further improved.

In some embodiments, an n-th sample, 1≤n≤N, in the intermediate audio signal may be mirrored from a corresponding n-th sample, counting backwards from the last sample of the discontinued input audio feed, in the last portion of the discontinued input audio feed, with N denoting the number of samples in the intermediate audio signal. Additionally, an amplitude of the n-th sample in the intermediate audio signal may be shifted (adjusted) such that a sum of the amplitude of the n-th sample in the intermediate audio signal and the amplitude of the corresponding n-th sample of the discontinued input audio feed, counting backwards from the last sample of the discontinued input audio feed, in the last portion of the discontinued input audio feed may equal two times the amplitude of the last sample of the discontinued input audio feed. As such, point-mirroring may be achieved.

In some embodiments, the fadeout function may comprise at least one of: a linear ramp, a cubic ramp, a squared cosine function, or a raised cosine function. Of course, any other suitable fadeout function may be applied thereto, as will be appreciated by the skilled person.

In some embodiments, the method may further comprise, prior to outputting the fadeout audio signal to the speaker, applying a saturating function to the fadeout audio signal. In particular, the saturating function may be implemented in any suitable manner, as will be appreciated by the skilled person. More particularly, the saturating function may be applied in such a manner that situations or artefacts, such as wraparound or clipping, may be reduced (or avoided) in the output audio signal.

In some embodiments, the method may further comprise storing (e.g., in a suitable buffer or memory) a predefined number samples of the input audio feed that have already been output for replay. The number of samples to be stored may be determined in accordance with the (predefined) fadeout period.

In some embodiments, the method may further comprise continuously updating the stored samples such that the latest predefined number of samples that have been outputted for replay are stored. That is to say, the storage (e.g., the buffer or memory) may be continuously updated (e.g., refreshed) in the course of the reception of the (continuous) input audio feed, such that only the latest predefined number of samples that have been outputted for replay are stored.

In some embodiments, the method may further comprise storing the samples of the input audio feed that have already been output for replay in a look-behind buffer. Accordingly, the intermediate audio signal may be generated based on the samples stored in the look-behind buffer or a subset thereof. As such, the discontinued input audio signal may be faded out efficiently, without the need of any look-ahead buffers to be implemented, thereby reducing or minimizing possible delay or latency (particularly caused by the look-ahead buffers) during fading out the discontinued audio signal. In addition, the quality of the output fadeout audio signal would also be not sacrificed, thereby preserving and ensuring satisfactory user experience.

Another aspect of the disclosure relates to an apparatus. In particular, the apparatus may comprise a receiving unit configured to receive an input audio feed comprising a plurality of samples. The input audio feed may for example be an audio playback signal (e.g., a song or a movie) or a continuous live stream (e.g., a live radio or TV broadcast channel). Depending on various circumstances, the input audio feed may be discontinued at some point of time. By way of example but not limitation, such discontinuity of the (old) input audio feed may for instance be caused or triggered by a user (or a consumer) deciding to switch to another feed (e.g., another audio or TV channel) and operating the remote control accordingly. For this, the apparatus may further comprise a determination unit configured to determine whether the input audio feed is discontinued. The determination (or, in some cases, detection) of the discontinuity of the input audio feed may be achieved in any suitable means, as will be appreciated by the skilled person. For instance, such determination or detection may involve monitoring the reception (e.g., by monitoring the receiving buffers) of the input audio feed. And, when discontinuity of the input audio feed is detected, the apparatus may comprise a signal generation unit configured to generate an intermediate audio signal comprising a plurality of samples based on the discontinued input audio feed. In other words, the intermediate audio signal may be generated based on the discontinued input audio feed, e.g., based partially or entirely on some or all of the (audio) samples thereof. In particular, in some cases it may be preferable that the intermediate audio signal may be generated based on a last portion (of samples) of the discontinued input audio feed that has been output for replay. In addition, the apparatus may further comprise a fadeout unit configured to apply a fadeout function to the intermediate audio signal to generate a fadeout audio signal. Particularly, the fadeout function may be implemented in any suitable manner, such that it can facilitate the smoothing of the earlier generated intermediate audio signal before being played back by the speaker. Finally, the apparatus may comprise an output unit configured to output the fadeout audio signal for replay by a speaker. The speaker may be part of an audio (or video) playback system (e.g., a TV with speakers).

Another aspect of the disclosure relates to another apparatus. In particular, the apparatus may comprise at least one processor and at least one memory including computer program code. In particular, the at least one memory and the computer program code may be configured to, with the at least one processor, cause the apparatus at least to perform any of the methods illustrated above.

Another aspect of the disclosure relates to a non-transitory computer readable medium. In particular, the non-transitory computer readable medium may comprise program instructions for causing an apparatus at least to perform any of the methods illustrated above.

Notably, the details of the disclosed method can be implemented as an apparatus adapted to execute some or all or the steps of the method, and vice versa, as will be appreciated by the skilled person, such that similar description may be omitted for the sake of conciseness. In particular, it is understood that methods according to the present disclosure relate to methods of operating the apparatus according to the above embodiments and variations thereof, and that respective statements made with regard to the apparatus likewise apply to the corresponding methods. In addition, the above aspects may be combined in many ways, even if not explicitly disclosed. The skilled person will understand that these combinations of aspects and features/steps are possible unless it creates a contradiction which is explicitly excluded.

Implementations of the disclosed apparatuses may include using, but not limited to, one or more processor, one or more application specific integrated circuit (ASIC) and/or one or more field programmable gate array (FPGA). Implementations of the apparatus may also include using other conventional and/or customized hardware such as software programmable processors.

Other and further embodiments of the present disclosure will become apparent during the course of the following discussion and by reference to the accompanying drawings.

BRIEF DESCRIPTION OF THE DRAWINGS

Example embodiments of the disclosure are explained below with reference to the accompanying drawings, wherein like reference numbers indicate like or similar elements, and wherein FIGS. 1a-1f schematically illustrate an example of a method for fading discontinued audio feeds for replay by a speaker according to an embodiment of the present disclosure;

FIGS. 2a-2c schematically illustrate various examples of determining a portion of samples for generating a fadeout signal according to an embodiment of the present disclosure;

FIG. 3 schematically illustrates, in flowchart form, a method for fading discontinued audio feeds for replay by a speaker according to an embodiment of the present disclosure; and FIG. 4 schematically illustrates an example of an apparatus according to an embodiment of the present disclosure.

DETAILED DESCRIPTION

As indicated above, identical or like reference numbers in the disclosure indicate identical or like elements, and repeated description thereof may be omitted for reasons of conciseness.

FIGS. 1a-1f schematically illustrate examples of methods for fading discontinued audio feeds for replay by a speaker according to an embodiment of the present disclosure. In particular, in the examples of FIGS. 1a-1f, the x axis generally represents the time in terms of samples of the audio signal; while the y axis generally represents the amplitudes of the samples of the audio signal.

Figure 1C:
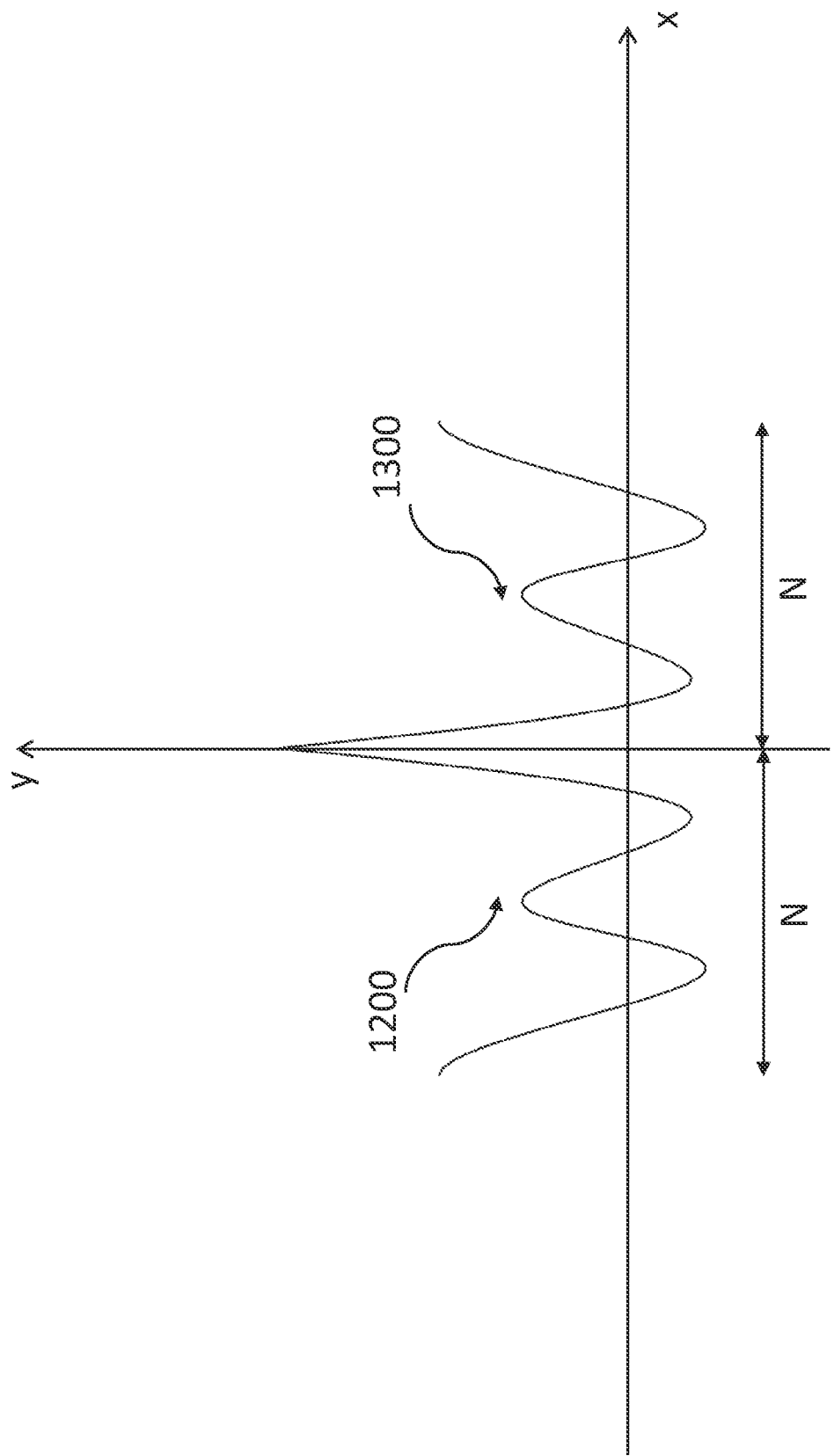

More particularly, as shown in FIG. 1a, an input audio feed 1100 may be received (e.g., by a suitable receiver of a consumer device). Notably, as will be appreciated by the skilled person, even though the input audio feed 1100 may seem to be a continuous analog audio signal as shown in FIG. 1a, the input audio feed 1100 may as well be a digital audio signal comprising a plurality of (discrete) digital (e.g., quantized) samples, which is assumed to be the case in the present examples as shown in FIGS. 1a-1f.

The input audio feed 1100 may be continuously received until a time instant t, when discontinuity of the input audio feed 1100 is detected. Such discontinuity may be caused by various reasons, such as a user deciding to switch to another channel. Upon detection of the discontinuity in the input audio feed 1100, the input audio feed 1100 may need to be faded out gracefully and efficiently, without (significantly) sacrificing the quality of the user experience. Broadly speaking, the basic idea of the present disclosure is to perform a fadeout on a time reversed version of the "old" signal (i.e., samples that have already been output).

Referring to FIG. 1b, it can be seen that a last portion 1200 with a number N of samples is extracted from the discontinued input audio feed 1100. Notably, from FIG. 1b onwards, the time instant t when the discontinuity in the input audio feed 1100 is detected has been (intentionally) shifted to the origin (i.e., 0), for the purpose of simplifying illustration (e.g., to possibly index the samples). In this sense, it may be considered that the last portion 1200 of the discontinued input audio feed 1100 comprises a number N of samples with indexes −1, −2, . . . , −N, respectively. Of course, in some cases, the index may as well start from 0 or any other suitable number, as will be appreciated by the skilled person.

In order to generate a fadeout audio signal based on the last portion 1200 of the discontinued input audio feed 1100, generally speaking, two alternatives may be possible as shown in FIGS. 1c and 1d, respectively.

In particular, in the first alternative as shown in FIG. 1c an intermediate audio signal 1300 may be generated by time-mirroring the samples of the last portion 1200. Put differently, the samples in the intermediate audio signal 1300 may be mirrored to the respective samples of the last portion 1200 with respect to the y axis. That is:

$$\forall n \in [1 \ldots N]: s'[n]=s[-n], \quad (1)$$

wherein s[−n] represents samples in the last portion 1200 of the discontinued input audio feed 1100, s'[n] represents samples in the generated intermediate signal 1300, and N denotes the fadeout period represented in the number of samples. In particular, the number N of samples of the fadeout period may for example be 128, 256, etc., depending on various implementations and/or requirements. Notably, this kind of mirroring operation may sometimes also be referred to as "edge-mirroring". That is to say, the first sample (of intermediate audio signal) after the last sample of the discontinued input audio feed corresponds to the first sample before the last sample of the discontinued input audio feed; the second sample after the last sample of the discontinued input audio feed corresponds to the first sample before the last sample of the discontinued input audio feed; and so forth.

As is already noticeable in the example of FIG. 1c, the combination of the last portion 1200 and the generated intermediate signal 1300, when stitched together, would exhibit a spike at the last sample of the last portion 1200 (which may also be referred to as s[0]). In this case, an additional filtering function, implemented in any suitable manner, may be applied thereto, such that the stitched-together signal (i.e., 1200+1300) may be continuous in the first order (or sometime also referred as the first order derivative) after the last sample s[0] of the last portion 1200.

On the other hand, in the second alternative as shown in FIG. 1d an intermediate audio signal 1400 may be generated by time-mirroring and also amplitude-mirroring the samples of the last portion 1200 with respect to the last sample s[0] in the last portion 1200 of the discontinued input audio feed 1100. Put differently, the samples in the intermediate audio signal 1400 may be mirrored to the respective samples of the last portion 1200, not only time-wise but also amplitude-wise, with respect to the last sample s[0] in the last portion 1200. That is:

$$\forall n \in [1 \ldots N]: s'[n]=2 \times s[0]-s[-n], \quad (2)$$

wherein s[−n] represents samples in the last portion 1200 of the discontinued input audio feed 1100, s'[n] represents samples in the generated intermediate signal 1400, and s[0] represents the last sample in the last portion 1200. Thus, opposing to the "edge-mirroring" in the first alternative as shown in FIG. 1c, this kind of mirroring operation may sometimes also be referred to as "point-mirroring". That is to say, the first sample (of intermediate audio signal) after the last sample of the discontinued input audio feed corresponds to the first sample before the last sample of the discontinued input audio feed, with the sum of the respective amplitudes of the first samples before and after the last sample of the discontinued input audio feed being equal to two times the amplitude of the last sample of the discontinued input audio feed; the second sample after the last sample of the discontinued input audio feed corresponds to the first sample before the last sample of the discontinued input audio feed, with the sum of the respective amplitudes of the second samples before and after the last sample of the discontinued input audio feed being equal to two times the amplitude of the last sample of the discontinued input audio feed; and so forth.

Notably, compared to the "edge-mirroring" (where respective amplitudes of the samples in the intermediate audio signal 1300 remain unchanged after mirroring) in the first alternative as shown in FIG. 1c, when generating the intermediate audio signal 1400 using point-mirroring, the amplitudes of samples in the intermediate audio signal 1400 are also mirrored with respect to the amplitude of the last sample s[0] of the discontinued input audio feed 1100. Particularly, since in point-mirroring amplitudes of the samples of the generated intermediate audio signal 1400 are also to be mirrored with respect to the last sample s[0] of the discontinued audio signal 1100, first order continuity (or, in other words, being continuous in the first derivative) would be (inherently) met already, as for example also shown in the curve of FIG. 1d. Therefore, the filtering function as mentioned above for smoothing the output curve for the edge-mirroring cases may be omitted (or avoided) in cases of point-mirroring. Thereby, efficiency of the overall fadeout method may be further improved.

Once the intermediate audio signal 1300 or 1400 is generated, there may further be provided a fadeout function in order to generate the final fadeout signal for replay. In particular, the fadeout function may be as simple as a linear ramp (as shown as the fadeout function 1500 in FIG. 1e), which may be simply represented as:

$$\forall n \in [1 \ldots N]: r[n]=1-n/N, \quad (3)$$

wherein r[n] denotes the fadeout function 1500.

Of course, other forms (e.g., more complex) of the fadeout function may be implemented, as will be appreciated by the skilled person. For instance (but not as limitation), the fadeout function may be implemented in the form of a cubic ramp, a squared cosine function, a raised cosine function, etc.

Figure 1E:
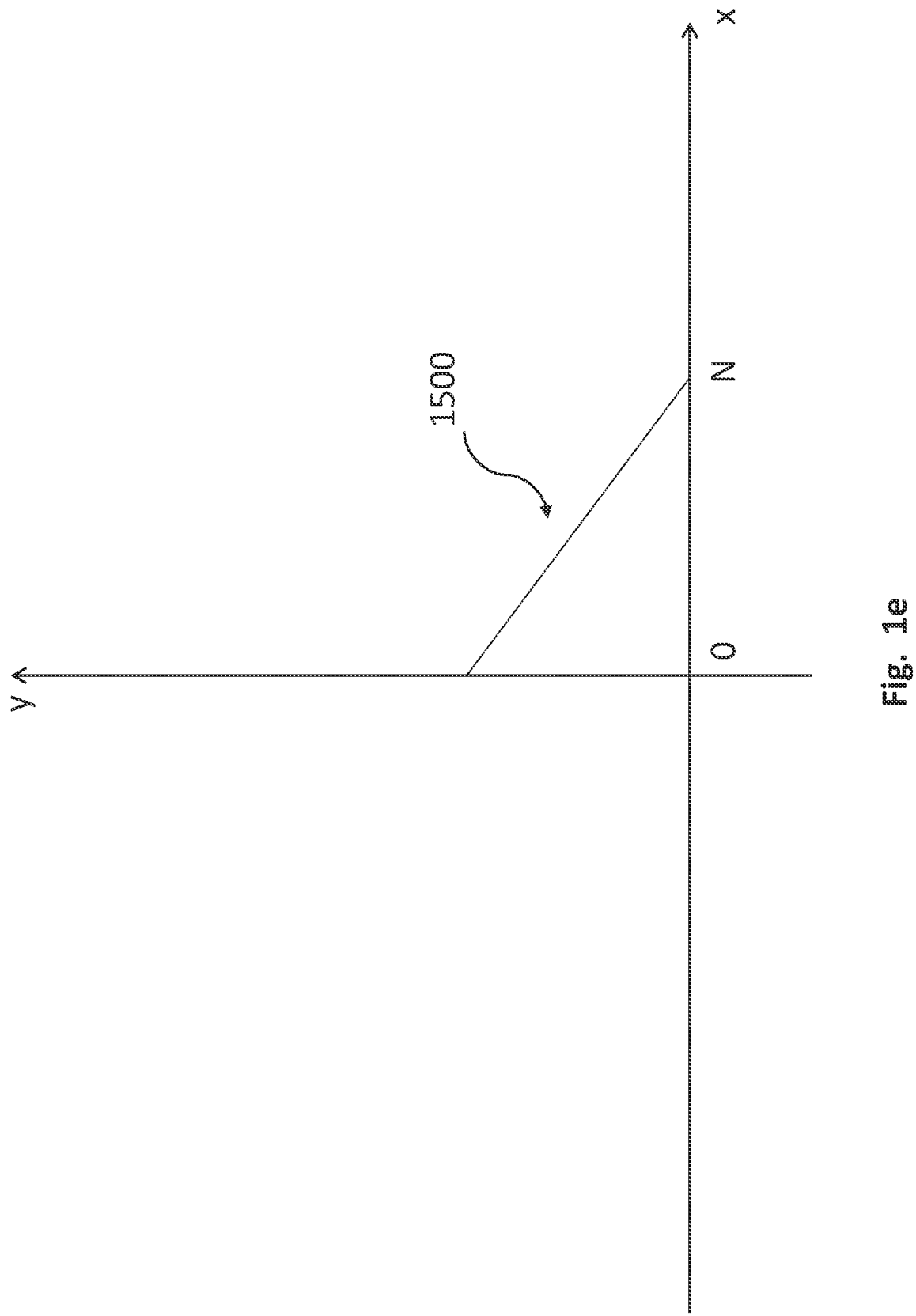
Figure 1F:
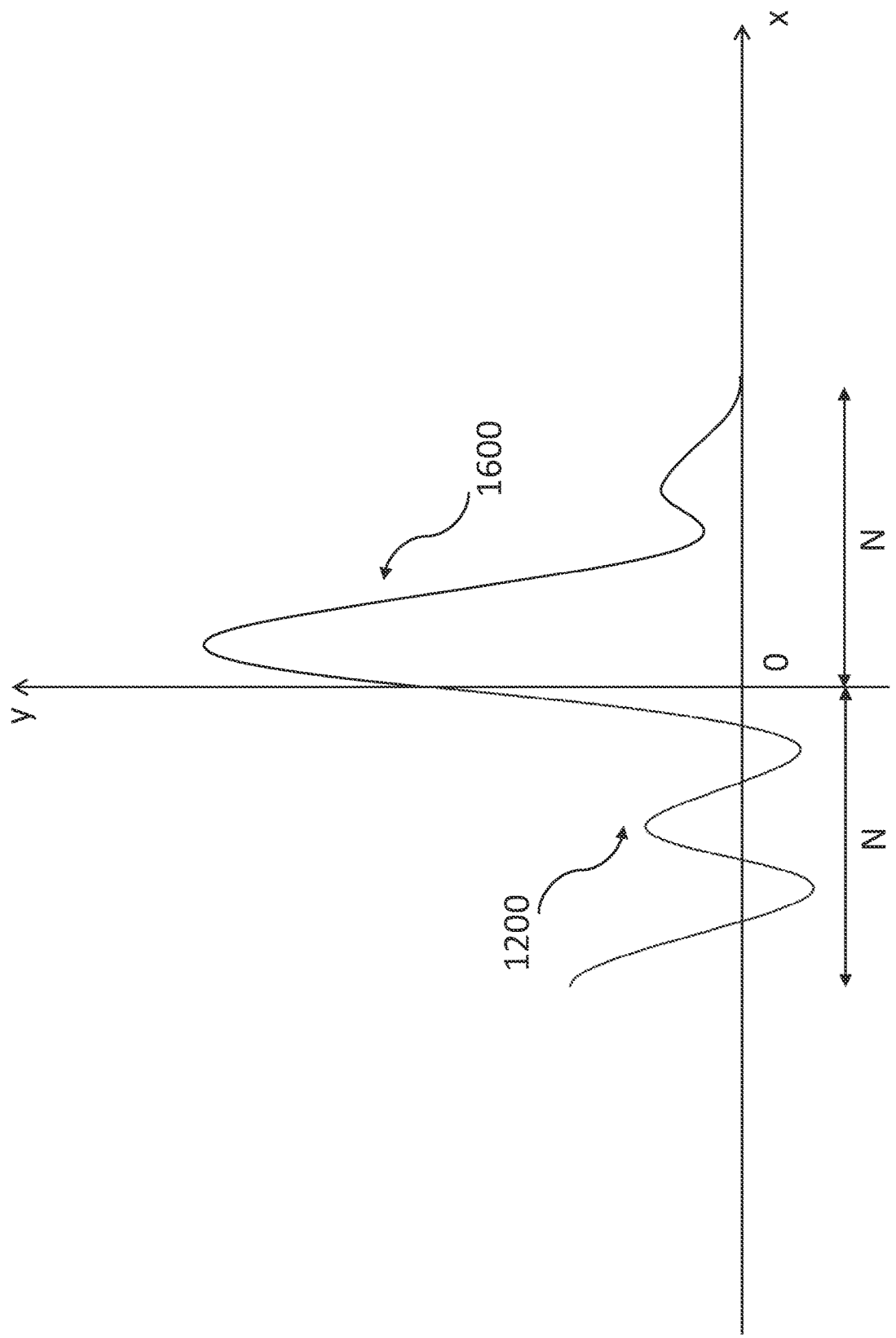

Finally, as shown in FIG. 1f, the fadeout function 1500 may be applied onto the generated intermediate signal 1300 or 1400, in order to generate the fadeout signal 1600 that can eventually be output for replay for example by a speaker. The fadeout signal 1600 may be represented as:

$$\forall n \in [1 \ldots N]: s''[n]=s'[n] \times r[n], \quad (4)$$

wherein s''[n] denotes the final output fadeout signal 1600.

Notably, in the example of FIG. 1f the fadeout function 1500 is applied to the intermediate signal 1400 (generated according to FIG. 1d), but it should be understood that such fadeout function 1500 may as well be applied to the intermediate signal 1300 (generated according to FIG. 1c), possibly after the additional filtering function as illustrated above; or to any other implementations of the intermediate signal, as will be appreciated by the skilled person.

It is also to be noted that, clipping (artifact) should generally be unlikely since typically there would be enough headroom in the signal; or be unnoticeable, since the signal would typically be faded out fairly quickly, but nevertheless may still happen in some cases. Therefore, it may be an option to additionally apply saturating arithmetic, prior to fading the signal out, to avoid wraparound. Any suitable saturating function may be implemented for this purpose, as will be appreciated by the skilled person.

Configured as such, particularly by utilizing the last portion 1200 of the discontinued input audio feed 1100, the discontinued input audio signal 1100 may be faded out gracefully and efficiently, without the need of any look-ahead buffers to be implemented. Typically, the look-ahead buffers may introduce delay/latency in the processing, since the buffers have to be filled with futures samples, i.e., samples that have not yet been played back. Such additional delay (or latency) may, in some cases, be undesirable for the performance of the whole system, particularly in the transition of fading out the old content and switching to the new content. Therefore, configured as proposed, possible delay or latency during fading out the discontinued audio signal 1100 may be reduced or minimized. In addition, since the samples are continuous at and after the last sample s[0] of the discontinued audio signal 1100, the quality of the output fadeout audio signal is also not sacrificed, thereby preserving and ensuring satisfactory user experience.

Figure 2A:
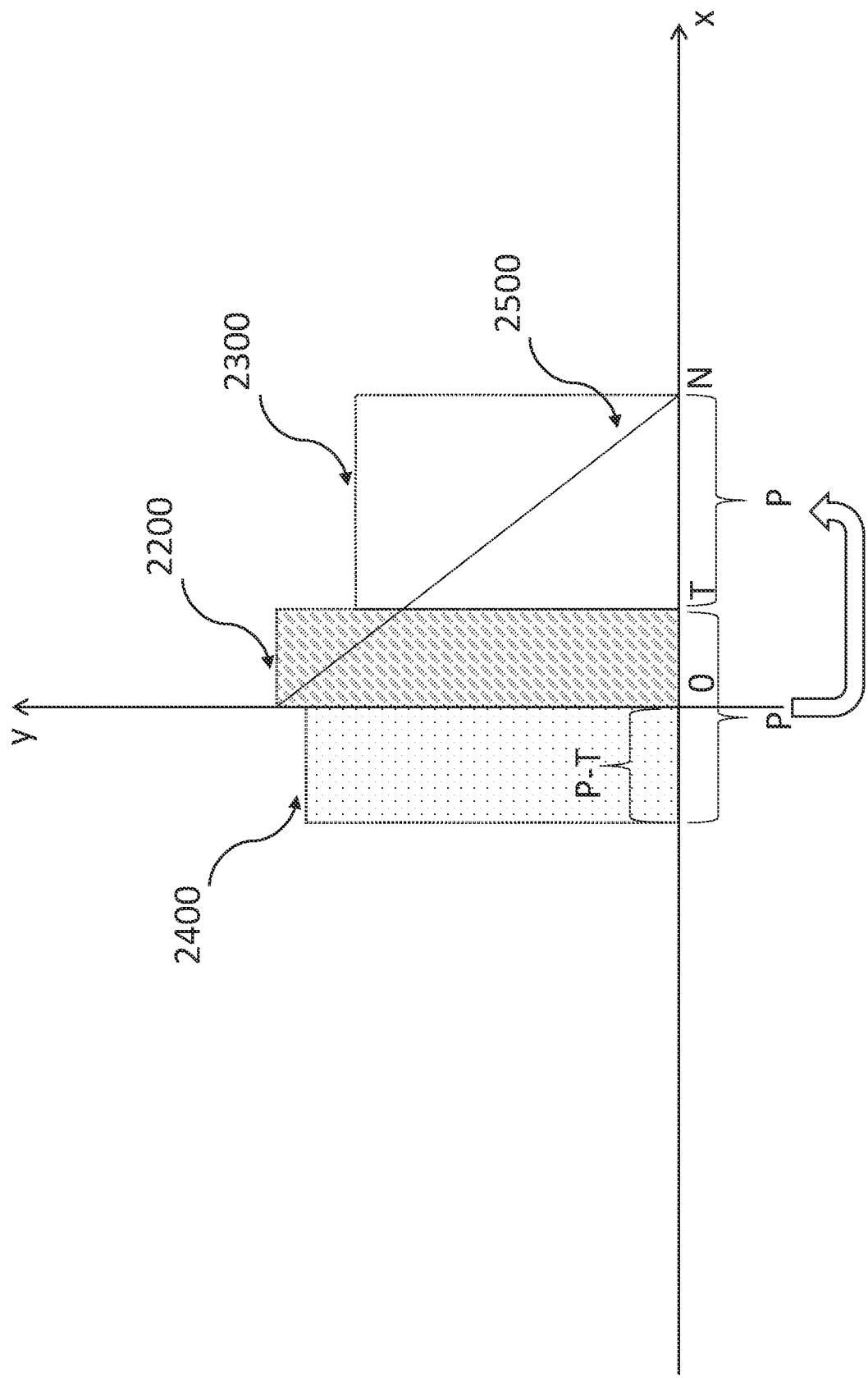
Figure 2B:
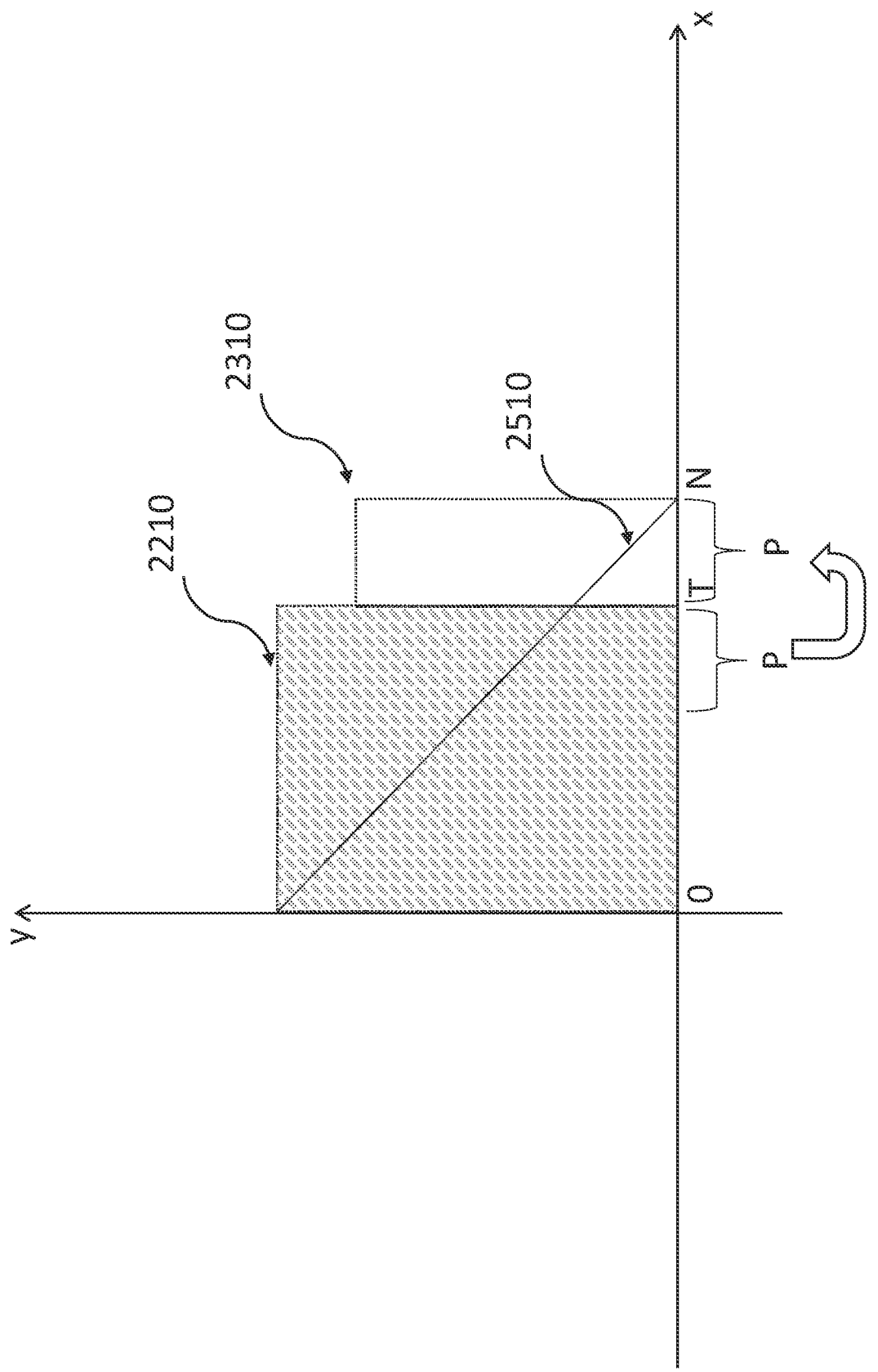

FIGS. 2*a*-2*c* schematically illustrate different examples of determining a portion of samples in the discontinued input audio feed for generating the output fadeout signal according to an embodiment of the present disclosure. As indicated above, identical or like reference numbers in the disclosure indicate identical or like elements, and repeated description thereof may be omitted for reasons of conciseness.

Broadly speaking, dependent on the availability of the content for fading out, the portion of input audio feed that has to be determined (extracted) may vary from 0 to N samples, wherein N (e.g., 128, 256, etc.) denotes the fadeout period as illustrated above.

In particular, in the example of FIG. 2*a* the line 2500 denotes a fadeout function applied for a fadeout period comprising N samples (starting from time instance 0). The fadeout function may be the same as or similar to the fadeout function 1500 as shown in FIG. 1*e*. That is to say, in order to generate the final fadeout signal for replay by a speaker, an intermediate signal comprising N samples may need to be generated. As illustrated above, the generation of the intermediate signal may be based on a last portion (e.g., the extracted last portion 1200 in FIG. 1*b*) of the discontinued input audio feed (e.g., the input audio feed 1100 in FIG. 1*a*).

Now, in the example of FIG. 2*a* there may be already a number T of samples available (represented as the striped block 2200) at the beginning of the fadeout procedure. Notably, the T samples may be available for various reason, as will be appreciated by the skilled person. For instance, it may be possible that the input audio feed only discontinues at time instance T, but the fadeout procedures starts already at time instance 0. In some other examples, it may be more likely that the input audio feed may come block-wise (i.e., arrive in blocks of samples), and data until time instance 0 may then be seen as "out of the door" already. In this case, the fadeout could be applied starting from time instance T, but starting at time instance 0 might be considered better for a number of reasons: e.g., less "lookback" samples, smaller distortion, smaller danger of clipping, etc. That is, the fading out of the input audio feed starts before the discontinuity happens in the input audio feed.

In some other examples, it is also possible that the T samples may be pre-stored (or pre-prepared), and may be from the same audio feed or from a (predefined) library, depending on various implementations and/or requirements. Since T samples are already available, then in the example of FIG. 2*a* only a number (N-T) (i.e., P) of samples (represented as the dashed block 2300) would be required to be generated for the intermediate audio signal. Notably, in the example of FIG. 2*a* the number P is assumed to be larger than the number T. Therefore, only an additional number (P-T) of samples (represented as the dotted block 2400) outside the already available T samples would correspondingly be required to be extracted from the input audio feed. As such, in the example of FIG. 2*a* only a number P (which is smaller than N) of samples 2300 would be required for the intermediate audio signal, in order to be combined (stitched) together with the T samples 2200 and to generate the final fadeout audio signal for playback by the speaker.

FIG. 2*b* illustrates a similar example where a number T of samples 2210 is already available at the beginning of the fadeout procedure. Since T samples are already available, then only a number (N-T) (i.e., P) of samples 2310 would be required to be generated for the intermediate audio signal.

Notably, compared to the example of FIG. 2*a*, in the example of FIG. 2*b* the number T is assumed to be larger than the number P.

Consequently, in this case it is only required to extract a number P of samples (directly) from the already available T samples, without the need to go further backwards from time instance 0 to search for samples. That is, the last P samples in the already available T samples of the input audio feed are enough for generating the intermediate audio signal. As such, in the example of FIG. 2*b* a number P of samples 2310 may be combined (stitched) with the available T samples 2210, in order to generate the final fadeout audio signal for playback by the speaker.

FIG. 2*c* refers to a specific example as an illustration for one possibility that may happen during the fadeout process. In particular, as can be seen from the specific example of FIG. 2*c*, the fadeout function 2520 is to be applied from the time instant T and continues for a time duration (i.e., the fadeout period) of N samples. Particularly, it can also be seen that all of the N samples that are needed for fadeout are already available in block 2220.

Therefore, in this specific example of FIG. 2*c* no intermediate audio signal needs to be generated and the fadeout process can be performed (solely) based on (a subset of) samples already available in the input audio feed 2220.

In view thereof, it can be generally concluded that the fadeout mechanism proposed in the present disclosure may support all possible sizes of samples that can be less than or equal to the fadeout period N. For this, it may generally mean that all (or a subset thereof) of the N (e.g., 256) "old" samples may need to be memorized from a previous call. In some cases, it may be that the storage (or buffer) is constantly refreshed/updated with the latest N (or the subset thereof) samples during the course of the reception of the input audio feed, as will be understood and appreciated by the skilled person.

FIG. 3 schematically illustrates, in flowchart form, a method 3000 for fading discontinued audio feeds for replay by a speaker according to an embodiment of the present disclosure.

In particular, the method 3000 comprises, at step S3100, receiving an input audio feed comprising a plurality of samples (e.g., the input audio feed 1100 of FIG. 1*a*). The method 3000 further comprises, at step S3200, determining whether the input audio feed is discontinued. If discontinuity in the input audio feed is not detected at step S3300, the method may comprise, at step S3700, outputting the received input audio feed for replay by the speaker, as before. Otherwise, if discontinuity in the input audio feed is detected at step S3300, the method 3000 further comprises, at step S3400, generating an intermediate audio signal (e.g., the intermediate audio signal 1300 of FIG. 1*c* or the intermediate audio signal 1400 of FIG. 1*d*) comprising a plurality of samples based on the discontinued input audio feed. In particular, the intermediate audio signal is generated based on a last portion (e.g., the last portion 1200 of FIG. 1*b*) of the discontinued input audio feed that has been output for replay. The method 3000 yet further comprises, at step S3500, applying a fadeout function (e.g., the fadeout function 1500 of FIG. 1*e*) to the intermediate audio signal to generate a fadeout audio signal (e.g., the fadeout signal 1600 of FIG. 1*f*). Finally, the method 3000 comprises, at step S3600, outputting the fadeout audio signal for replay by the speaker.

FIG. 4 schematically illustrates an example of an apparatus 4000 according to an embodiment of the present disclosure.

In particular, the apparatus 4000 comprises a receiving unit 4100 configured to receive an input audio feed 410 comprising a plurality of samples. The input audio feed 410 may be the same as or similar to the input audio feed 1100 as shown in FIG. 1*a*, for example. Depending on various circumstances, the input audio feed 410 may be discontinued at some point of time. By way of example but not limitation, such discontinuity of the input audio feed 410 may for instance be caused or triggered by a user (or a consumer) deciding to switch to another feed (e.g., another audio or TV channel) and operating the remote control accordingly. For this, the apparatus 4100 further comprises a determination unit 4200 configured to determine whether the input audio feed 410 is discontinued. The determination (or, in some cases, detection) of the discontinuity of the input audio feed 410 may be achieved in any suitable means, as will be appreciated by the skilled person. For instance, such determination or detection may involve monitoring the reception (e.g., by monitoring the receiving buffers) of the input audio feed 410. And, when discontinuity of the input audio feed 410 is detected, the apparatus 4000 further comprises a signal generation unit 4300 configured to generate an intermediate audio signal (e.g., the intermediate audio signal 1300 of FIG. 1*c* or the intermediate audio signal 1400 of FIG. 1*d*) comprising a plurality of samples based on the discontinued input audio feed 410. In other words, the intermediate audio signal may be generated based on the discontinued input audio feed, e.g., based partially or entirely on some or all of the (audio) samples thereof. In particular, in some cases it may be preferable that the intermediate audio signal is generated based on a last portion (e.g., the last portion 1200 of FIG. 1*b*) of the discontinued input audio feed 410 that has been output for replay. In addition, the apparatus 4000 yet further comprises a fadeout unit 4400 configured to apply a fadeout function (e.g., the fadeout function 1500 of FIG. 1*e*) to the intermediate audio signal to generate a fadeout audio signal (e.g., the fadeout signal 1600 of FIG. 1*f*). Particularly, the fadeout function may be implemented in any suitable manner, such that it can help to smooth the earlier generated intermediate audio signal before being played back by the speaker. For instance (but not as limitation), the fadeout function may be implemented in the form of a linear ramp, a cubic ramp, a squared cosine function, a raised cosine function, etc., as will be appreciated by the skilled person. Finally, the apparatus 4000 comprises an output unit 4500 configured to output the fadeout audio signal for replay by a speaker 420. The speaker 420 may be part of an audio (or video) playback system (e.g., a TV with speakers).

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

A computer program product may, for example, be software. Software may be implemented in various ways. Software may be transmitted or received over a network via a network interface device or may be distributed via a carrier medium. A carrier medium may include but is not limited to, non-volatile media, volatile media, and transmission media. Non-volatile media may include, for example, optical, magnetic disks, and magneto-optical disks. Volatile media may include dynamic memory, such as main memory. Transmission media may include coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

Note that when the method to be carried out includes several elements, e.g., several steps, no ordering of such elements is implied, unless specifically stated otherwise.

Reference throughout this disclosure to "one embodiment", "some embodiments" or "an embodiment" means that a particular feature described in connection with the embodiment is included in at least one embodiment of the present disclosure. Thus, appearances of the phrases "in one embodiment", "in some embodiments" or "in an embodiment" in various places throughout this disclosure are not necessarily all referring to the same embodiment. Furthermore, the particular features may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, device structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, steps may be added or deleted to methods described within the scope of the present disclosure.

The invention claimed is:

1. A method for fading discontinued audio feeds for replay by a speaker, the method comprising:
    receiving an input audio feed comprising a plurality of samples;
    determining whether the input audio feed is discontinued; and
    when discontinuity of the input audio feed is detected:
    generating an intermediate audio signal comprising a plurality of samples based on the discontinued input audio feed, wherein generating the intermediate audio signal involves time-mirroring the samples in the last portion of the discontinued input audio feed while maintaining respective amplitudes of the samples;
    applying a fadeout function to the intermediate audio signal to generate a fadeout audio signal; and
    outputting the fadeout audio signal for replay by the speaker,
    wherein the intermediate audio signal is generated based on a last portion of the discontinued input audio feed that has been output for replay, wherein a number of samples in the intermediate audio signal equals a number of samples in the last portion of the discontinued input audio feed.

2. The method according to claim 1, wherein the intermediate audio signal is generated such that samples of the intermediate audio signal mirror samples of the last portion of the discontinued input audio feed.

3. The method according to claim 1, wherein generating the intermediate audio signal involves time-mirroring samples of the last portion of the discontinued input audio feed such that samples corresponding to samples of the last portion are included in the samples of the intermediate audio signal in reverse order.

4. The method according to claim 1, wherein the intermediate audio signal is generated such that the last portion of the discontinued input audio feed together with the intermediate audio signal is continuous.

5. The method according to claim 1, further comprising:
    prior to generating the intermediate audio signal, determining a number of samples to be generated for the intermediate audio signal in accordance with a predefined fadeout period; and/or
    prior to generating the intermediate audio signal, determining a number of samples of the last portion of the discontinued input audio feed in accordance with a predefined fadeout period, for use in generating the intermediate audio signal.

6. The method according to claim 1, wherein generating the intermediate audio signal involves reordering the samples in the last portion of the discontinued input audio feed in reverse order.

7. The method according to claim 1, wherein the intermediate audio signal is generated by time-mirroring the samples in the last portion of the discontinued input audio feed.

8. The method according to claim 1, wherein generating the intermediate audio signal involves point-mirroring the samples in the last portion of the discontinued input audio feed.

9. The method according to claim 8, wherein point-mirroring the samples involves mirroring the corresponding samples in the last portion of the discontinued input audio feed with respect to the last sample of the discontinued input audio feed.

10. The method according to claim 8, wherein point-mirroring the samples involves mirroring amplitudes of the corresponding samples in the last portion of the discontinued input audio feed with respect to the amplitude of the last sample of the discontinued input audio feed.

11. The method according to claim 1,
    wherein an n-th sample, $1 \leq n \leq N$, in the intermediate audio signal is mirrored from a corresponding n-th sample, counting backwards from the last sample of the discontinued input audio feed, in the last portion of the discontinued input audio feed, with N denoting the number of samples in the intermediate audio signal; and
    an amplitude of the n-th sample in the intermediate audio signal is shifted such that a sum of the amplitude of the n-th sample in the intermediate audio signal and the amplitude of the corresponding n-th sample of the discontinued input audio feed, counting backwards from the last sample of the discontinued input audio feed, in the last portion of the discontinued input audio feed equals two times the amplitude of the last sample of the discontinued input audio feed.

12. The method according to claim 1, wherein the fadeout function comprises at least one of a linear ramp, a cubic ramp, a squared cosine function, or a raised cosine function.

13. The method according to claim 1, further comprising:
    prior to outputting the fadeout audio signal to the speaker, applying a saturating function to the fadeout audio signal.

14. The method according to claim 1, further comprising:
    storing a predefined number samples of the input audio feed that have already been output for replay.

15. The method according to claim 14, further comprising:
    continuously updating the stored samples such that the latest predefined number of samples that have been outputted for replay are stored.

16. The method according to claim 1, further comprising:
    storing the samples of the input audio feed that have already been output for replay in a look-behind buffer,
    wherein the intermediate audio signal is generated based on the samples stored in the look-behind buffer or a subset thereof.

17. An apparatus comprising:
    a receiving unit configured to receive an input audio feed comprising a plurality of samples;

a determination unit configured to determine whether the input audio feed is discontinued; and when discontinuity of the input audio feed is detected:

a signal generation unit configured to generate an intermediate audio signal comprising a plurality of samples based on the discontinued input audio feed, wherein generating the intermediate audio signal involves time-mirroring the samples in the last portion of the discontinued input audio feed while maintaining respective amplitudes of the samples;

a fadeout unit configured to apply a fadeout function to the intermediate audio signal to generate a fadeout audio signal; and an output unit configured to output the fadeout audio signal for replay by a speaker, wherein the signal generation unit is configured to generate the intermediate audio signal based on a last portion of the discontinued input audio feed that has been output for replay, wherein a number of samples in the intermediate audio signal equals a number of samples in the last portion of the discontinued input audio feed.

18. A non-transitory computer readable medium comprising program instructions for causing an apparatus at least to perform the method according to claim 1.

* * * * *